(12) United States Patent
Pfeifer

(10) Patent No.: US 8,676,618 B2
(45) Date of Patent: Mar. 18, 2014

(54) SYSTEMS AND METHODS FOR AUTOMATIC DETECTION AND PROCESSING OF INSTANCES OF BUSINESS RULES

(75) Inventor: Tobias Pfeifer, Rauenberg (DE)

(73) Assignee: SAP AG, Walldorf (DE)

(*) Notice: Subject to any disclaimer, the term of this patent is extended or adjusted under 35 U.S.C. 154(b) by 1932 days.

(21) Appl. No.: 11/647,097

(22) Filed: Dec. 28, 2006

(65) Prior Publication Data

US 2008/0162395 A1 Jul. 3, 2008

(51) Int. Cl.
*G06Q 10/00* (2012.01)

(52) U.S. Cl.
USPC .......................................................... 705/7.11

(58) Field of Classification Search
USPC .......................................................... 705/7.11
See application file for complete search history.

(56) References Cited

U.S. PATENT DOCUMENTS

| | | | | |
|---|---|---|---|---|
| 5,619,621 | A * | 4/1997 | Puckett | 706/47 |
| 6,061,682 | A * | 5/2000 | Agrawal et al. | 707/694 |
| 6,108,620 | A * | 8/2000 | Richardson et al. | 704/9 |
| 6,243,669 | B1 * | 6/2001 | Horiguchi et al. | 704/9 |
| 6,330,530 | B1 * | 12/2001 | Horiguchi et al. | 704/4 |
| 6,460,043 | B1 * | 10/2002 | Tabbara et al. | 1/1 |
| 6,529,865 | B1 * | 3/2003 | Duan et al. | 704/9 |
| 6,658,624 | B1 * | 12/2003 | Savitzky et al. | 715/235 |
| 6,856,979 | B1 * | 2/2005 | Chefalas et al. | 706/47 |
| 6,886,115 | B2 * | 4/2005 | Kondoh et al. | 714/52 |
| 6,938,240 | B2 * | 8/2005 | Charisius et al. | 717/104 |
| 7,117,273 | B1 * | 10/2006 | O'Toole et al. | 709/252 |
| 7,168,077 | B2 * | 1/2007 | Kim et al. | 718/106 |
| 7,188,091 | B2 * | 3/2007 | Huelsman et al. | 706/47 |
| 7,313,552 | B2 * | 12/2007 | Lorenz et al. | 706/47 |
| 7,337,950 | B2 * | 3/2008 | DeVault | 235/376 |
| 7,383,240 | B2 * | 6/2008 | Mital et al. | 706/47 |
| 7,464,032 | B2 * | 12/2008 | Wang | 704/251 |
| 7,536,369 | B2 * | 5/2009 | Dejean | 706/47 |
| 7,574,347 | B2 * | 8/2009 | Wang | 704/7 |
| 7,657,495 | B2 * | 2/2010 | Hunter et al. | 706/20 |
| 7,890,928 | B2 * | 2/2011 | Patrudu | 717/114 |
| 8,171,539 | B2 * | 5/2012 | Miranda | 726/13 |
| 2004/0260667 | A1 * | 12/2004 | Huelsman et al. | 706/47 |

OTHER PUBLICATIONS van der Aalst, W.M.P. et al., XML Based Schema Definition for Support of Inter-organizational Workflow INFORMS, vol. 14, No. 1, Mar. 2003.*
Merritt, Dennis, Best Practices for Rule-Based Application Development Microsoft MSDN, Jan. 2004.*
Fu, Yongjian, Discovery of Multi-Level Rules From Large Databases Simon Fraser University, Jul. 1996.*

* cited by examiner

*Primary Examiner* — Scott L Jarrett
(74) *Attorney, Agent, or Firm* — Mintz, Levin, Cohn, Ferris, Glovsky and Popeo P.C.

(57) ABSTRACT

A method for processing instances of business rules, includes providing a business rule, parsing the business rule to extract entities used as rule parts, creating a hierarchical entity buffer indicating the entities used as the rule parts and identifying instances of each of the entities and real data corresponding to each of the identified instances of the entities and creating a step result table indicating instances of the business rule and information identifying the real data in the hierarchical entity buffer used by each of the instances of the business rule.

12 Claims, 16 Drawing Sheets

Figure 5A

| Leave | Represents Rule Part | Result ID | Parent Result ID | Real result (example) | Field-Match |
|---|---|---|---|---|---|
| Leasing item 51 | X | 1 | | 6705AE9C85B9474AB5E314E97CC2CF3F | X |
| | | 2 | | 9705BE9C85B9474AB5E314E97CC2CF3F | X |
| Payer (Parent = Leasing item) | | 1 | 1 | 1205AE9C85B9474AB5E314E97CC2CF3F | X |
| | | 2 | 2 | 2205AE9C85B9474AB5E314E97CC2CF3F | |
| | | 3 | 2 | 3205AE9C85B9474AB5E314E97CC2CF3F | X |
| Open items (Parent = Payer) | X | 1 | 1 | 0 | X |
| | | 2 | 2 | 4 | |
| | | 3 | 3 | 2 | |

Figure 7A

| Leave ID | Parent Leave ID | Leave | Represents Rule Part | Result ID | Parent Result ID | Real result (example) | Field Match |
|---|---|---|---|---|---|---|---|
| 1 | 0 | Leasing item | X | 1 | | 6705AE9C85B9474AB5E314E97CC2CF3F | X |
| | | | | 2 | | 9705BE9C85B9474AB5E314E97CC2CF3F | X |
| 2 | 1 | Sold-To | X | 1 | 1 | 4005AE9C85B9474AB5E314E97CC2CF3F | X |
| | | | | 2 | 2 | 5005BE9C85B9474AB5E314E97CC2CF3F | X |
| 3 | 1 | Payer | | 1 | 1 | 1205AE9C85B9474AB5E314E97CC2CF3F | X |
| | | | | 2 | 2 | 2205AE9C85B9474AB5E314E97CC2CF3F | |
| | | | | 3 | 2 | 3205AE9C85B9474AB5E314E97CC2CF3F | X |
| 4 | 3 | Open items | X | 1 | 1 | 5 | X |
| | | | | 2 | 2 | 4 | |
| | | | | 3 | 3 | 2 | |
| 5 | 3 | Scoring value | X | 1 | 1 | A | X |
| | | | | 2 | 2 | B | |
| | | | | 3 | 3 | B | |

Figure 8

| | Leasing contract item (leave ID 1) | Scoring value (leave ID 5) | Open items (count) (leave ID 4) | Sold-To (leave ID 2) |
|---|---|---|---|---|
| Leasing contract item (leave ID 1) | 1 | 1 | 1 | 1 |
| Scoring value (leave ID 5) | | 5 | 3 | 1 |
| Open items (count) (leave ID 4) | | | 4 | 1 |
| Sold-To (leave ID 2) | | | | 2 |

Figure 9A

| TT | | |
|---|---|---|
| Step | Leave ID | Result ID |
| 1 | 1 | 1 |
| 2 | 1 | 2 |

Figure 9B

| MT | | |
|---|---|---|
| Step | Leave ID | Result ID |
| 1 | 1 | 1 |
| 2 | 1 | 2 |

Figure 10A

| TT | | |
|---|---|---|
| Step (Rule Instance) | Leave ID | Result ID |
| 1 | 1 | 1 |
| 1 | 3 | 1 |
| 1 | 5 | 1 |
| 2 | 1 | 2 |
| 2 | 3 | 2 |
| 2 | 5 | 2 |
| 3 | 1 | 2 |
| 3 | 3 | 3 |
| 3 | 5 | 3 |

Figure 10B

| MT | | |
|---|---|---|
| Step | Leave ID | Result ID |
| 1 | 1 | 1 |

| TT | | |
|---|---|---|
| Step | Leave ID | Result ID |
| 1 | 1 | 1 |
| 1 | 3 | 1 |
| 1 | 5 | 1 |

Figure 10C

| MT | | |
|---|---|---|
| Step | Leave ID | Result ID |
| 1 | 1 | 1 |
| 1 | 3 | 1 |
| 1 | 5 | 1 |
| 2 | 1 | 2 |

Added

Figure 10D

| MT | | |
|---|---|---|
| Step | Leave ID | Result ID |
| 1 | 1 | 1 |
| 1 | 3 | 1 |
| 1 | 5 | 1 |
| TT | | |
| Step | Leave ID | Result ID |
| 2 | 1 | 2 |
| 2 | 3 | 2 |
| 2 | 5 | 2 |

Figure 10E.

| MT | | |
|---|---|---|
| Step | Leave ID | Result ID |
| 1 | 1 | 1 |
| 1 | 3 | 1 |
| 1 | 5 | 1 |
| TT | | |
| Step | Leave ID | Result ID |
| 3 | 1 | 2 |
| 3 | 3 | 3 |
| 3 | 5 | 3 |

Figure 10F

| MT | | |
|---|---|---|
| Step | Leave ID | Result ID |
| 2 | 1 | 2 |
| TT | | |
| Step | Leave ID | Result ID |
| 1 | 1 | 1 |
| 1 | 3 | 1 |
| 1 | 5 | 1 |

Figure 10G

| MT | | |
|---|---|---|
| Step | Leave ID | Result ID |
| 2 | 1 | 2 |
| TT | | |
| Step | Leave ID | Result ID |
| 2 | 1 | 2 |
| 2 | 3 | 2 |
| 2 | 5 | 2 |

Figure 10H

| MT | | |
|---|---|---|
| Step | Leave ID | Result ID |
| 1 | 1 | 1 |
| 1 | 3 | 1 |
| 1 | 5 | 1 |
| 2 | 1 | 2 |
| 2 | 3 | 2 |
| 2 | 5 | 2 |

Figure 10I

| MT | | |
|---|---|---|
| Step | Leave ID | Result ID |
| 2 | 1 | 2 |
| TT | | |
| Step | Leave ID | Result ID |
| 3 | 1 | 2 |
| 3 | 3 | 3 |
| 3 | 5 | 3 |

Figure 10J

| MT | | |
|---|---|---|
| Step | Leave ID | Result ID |
| 1 | 1 | 1 |
| 1 | 3 | 1 |
| 1 | 5 | 1 |
| 2 | 1 | 2 |
| 2 | 3 | 2 |
| 2 | 5 | 2 |
| 3 | 1 | 2 |
| 3 | 3 | 3 |
| 3 | 5 | 3 |

Figure 10K

| Step | Leave ID | Result ID |
|---|---|---|
| TT | | |
| 1 | 1 | 1 |
| 1 | 3 | 1 |
| 1 | 4 | 1 |
| 2 | 1 | 2 |
| 2 | 3 | 2 |
| 2 | 4 | 2 |
| 3 | 1 | 2 |
| 3 | 3 | 3 |
| 3 | 4 | 3 |

Figure 10L

| | Leasing contract item (leave ID 1) | Scoring value (leave ID 5) | Open items (count) (leave ID 4) | Sold-To (leave ID 2) |
|---|---|---|---|---|
| Leasing contract item (leave ID 1) | 1 | 1 | 1 | 1 |
| Scoring value (leave ID 5) | | 5 | 3 | 1 |
| Open items (count) (leave ID 4) | | | 4 | 1 |
| Sold-To (leave ID 2) | | | | 2 |

Figure 10N

| MT | | |
|---|---|---|
| Step | Leave ID | Result ID |
| 1 | 1 | 1 |
| 1 | 3 | 1 |
| 1 | 5 | 1 |
| 1 | 4 | 1 |
| 2 | 1 | 2 |
| 2 | 3 | 2 |
| 2 | 5 | 2 |
| 2 | 4 | 2 |
| 3 | 1 | 2 |
| 3 | 3 | 3 |
| 3 | 5 | 3 |
| 3 | 4 | 3 |

Figure 10O

| MT | | |
|---|---|---|
| Step | Leave ID | Result ID |
| 1 | 1 | 1 |
| 1 | 2 | 1 |
| 1 | 3 | 1 |
| 1 | 5 | 1 |
| 1 | 4 | 1 |
| 2 | 1 | 2 |
| 2 | 2 | 2 |
| 2 | 3 | 2 |
| 2 | 5 | 2 |
| 2 | 4 | 2 |
| 3 | 1 | 2 |
| 3 | 2 | 2 |
| 3 | 3 | 3 |
| 3 | 5 | 3 |
| 3 | 4 | 3 |

SYSTEMS AND METHODS FOR AUTOMATIC DETECTION AND PROCESSING OF INSTANCES OF BUSINESS RULES

BACKGROUND

1. Technical Field

The present disclosure relates generally to business rules and, more particularly, to systems and methods for automatic detection and processing of instances of business rules.

2. Description of the Background Art

The automatic evaluation and processing of business rules is more and more becoming a very important capability of business software products across industries. The manual processing of such rules can be very time and cost consuming.

It is crucial for any business that rules be created as easy as possible. For example, it is important that rules are capable of being formulated in a business language, without having to learn a special programming syntax. A clerk that creates and maintains rules should only need to be concerned with the definition of the rule itself and not with extraneous information such as for which and for how many entities his or her rule could potentially be evaluated in case it is triggered.

For example, assume a clerk creates a rule for financing contracts that says:

"If a payer for a leasing contract item has a scoring value less than B, and there are more than 3 billing items open, start dunning the Sold-To."

The business context could be that this rule is started for a bundle contract that contains more than one leasing contract item. Furthermore, there might be more than one payer per leasing contract item.

The clerk should not have to be concerned with creating a rule that covers all instances to account for multiple leasing contract items and/or multiple payers, etc. For example, the above rule could also be created as follows to account for multiple leasing contract items and/or multiple payers:

Loop at the leasing contract items in the bundle contract
   Loop at the payers for the individual leasing contract item
      Check the following rule per individual leasing contract and per payer in this contract
      "If the payer for the leasing contract item has a scoring value less than B, and there are more than 3 billing items open, start dunning the Sold-To."

The application itself should hide this complexity by determining and processing the right instances of entities in the context given when the rule is started.

SUMMARY

This application describes tools (in the form of methodologies, apparatuses, and systems) for the automatic detection and processing of instances of business rules. The tools may be embodied in one or more computer programs stored on a computer readable medium or program storage device and/or transmitted in the form of a computer data signal in one or more segments via a computer network or other transmission medium.

A method for processing instances of business rules, includes providing a business rule, parsing the business rule to extract entities used as rule parts, creating a hierarchical entity buffer indicating the entities used as the rule parts and identifying instances of each of the entities and real data corresponding to each of the identified instances of the entities and creating a step result table indicating instances of the business rule and information identifying the real data in the hierarchical entity buffer used by each of the instances of the business rule.

A system for processing instances of business rules, includes a providing module for providing a business rule, a parsing module for parsing the business rule to extract entities used as rule parts, a buffer creating module for creating a hierarchical entity buffer indicating the entities used as the rule parts and identifying instances of each of the entities and real data corresponding to each of the identified instances of the entities and a table creating module for creating a step result table indicating instances of the business rule and information identifying the real data in the hierarchical entity buffer used by each of the instances of the business rule.

A computer recording medium including computer executable for processing instances of business rules, includes code for providing a business rule, code for parsing the business rule to extract entities used as rule parts, code for creating a hierarchical entity buffer indicating the entities used as the rule parts and identifying instances of each of the entities and real data corresponding to each of the identified instances of the entities and code for creating a step result table indicating instances of the business rule and information identifying the real data in the hierarchical entity buffer used by each of the instances of the business rule.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompany in drawings, wherein:

FIGS. 5A and 5B show a hierarchical entity buffer and its corresponding hierarchical tree, respectively, for describing embodiments of the present disclosure;

FIGS. 7A and 7B show another example of a hierarchical entity buffer and its corresponding hierarchical tree, respectively;

FIG. 8 shows an example of a table used to determine a lowest common leaf in the hierarchy for each combination of business rule parts.

FIGS. 9A-10O are tables showing examples for describing aspects of embodiments of the present disclosure.

DETAILED DESCRIPTION

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
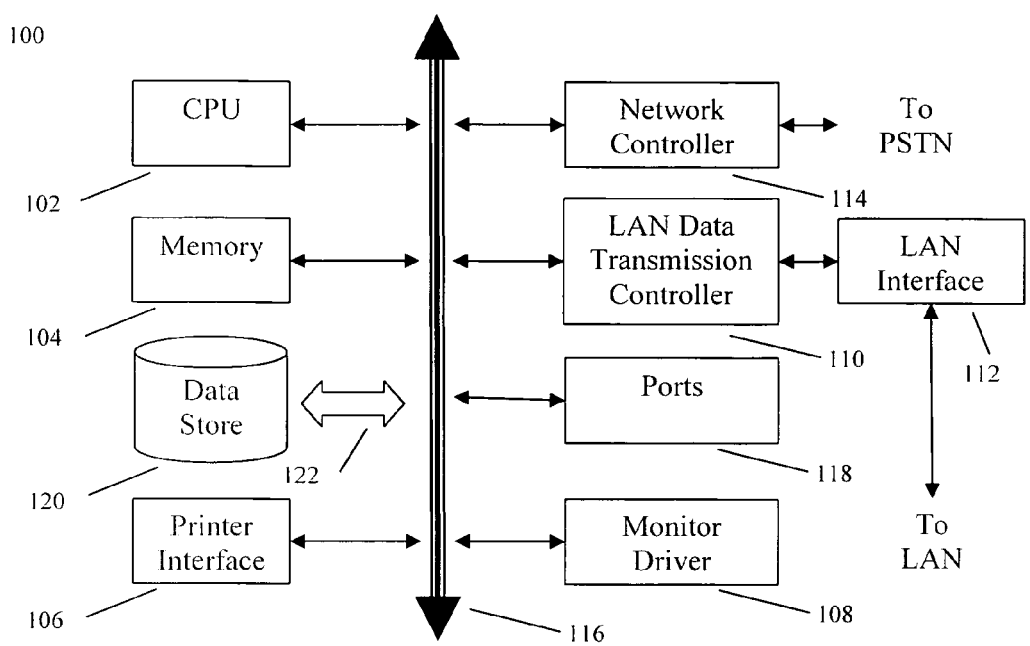
FIG. 1 shows a block diagram of an example of a computer system capable of implementing embodiments of the present disclosure.

FIG. 1 shows an example of a computer system 100 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

The computer system 100 is merely exemplary. The specific embodiments described herein are illustrative, computer system(s) as referred to herein may include(s) individual computers, servers, computing resources, networks, etc., and many variations can be introduced on these embodiments without departing from the spirit of the disclosure or from the scope of the appended claims.

Figure 2:
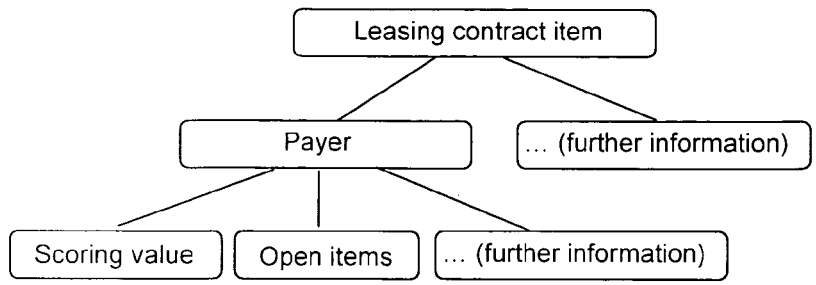
FIG. 2 shows a hierarchical business entity model for explaining various aspects of embodiments of the present disclosure.

One general approach for detecting and processing of instances of business rules according to an embodiment of the present disclosure is shown in FIG. 2. The starting point is a hierarchical business entity model that fits both the business language and the application domain. A hierarchical model tree showing a relationship between each entity to be used in a rule can be drawn as shown in FIG. 2. The tree shown in FIG. 2 shows the relationship of each entity for the following rule:

"If a payer for a leasing contract item has a scoring value less than B, and there are more than 3 billing items open, start dunning the Sold-To."

The hierarchical model tree shown in FIG. 2 is displayed to the designer of the rule (e.g., the user). When designing the rule, the user can thus pick certain entities of the business rule visually out of the tree. This also enables a structured drill down into the business data when defining a rule. Furthermore, the application itself can also determine the number of instances per entity, which also depends on the hierarchy. For example, there might be 2 leasing contract items, the first of which has 2 payers whereas the second has 5 payers. In total, there are 7 payers. These are referred to herein as "instances" of the entity payer. Each payer may also have a scoring value, open items, etc. associated with it, as shown in FIG. 2.

According to an embodiment of the present disclosure, an algorithm takes care of the hierarchical dependencies and uses them to determine how often the complete rule has to be executed and exactly which instances the individual run for the rule has to use. To do this, embodiments of the present disclosure "synchronize" on certain entities in the hierarchical entity model.

Figure 3A:
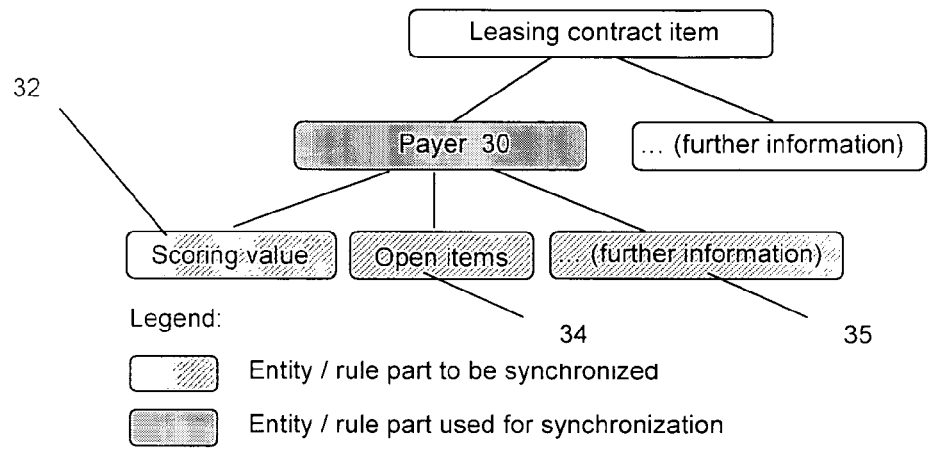
FIGS. 3A and 3B show additional hierarchical business entity models for explaining various aspects of embodiments of the present disclosure.

For example, to assure in a single run of a rule that "scoring value" and "open items" are always evaluated from the same payer, the present system may synchronize on the "payer" entity 30, as shown in FIG. 3A. This will ensure that only the scoring value 32, open items 34 and any other items 35 for that payer 30 will be used for that run.

Figure 3B:
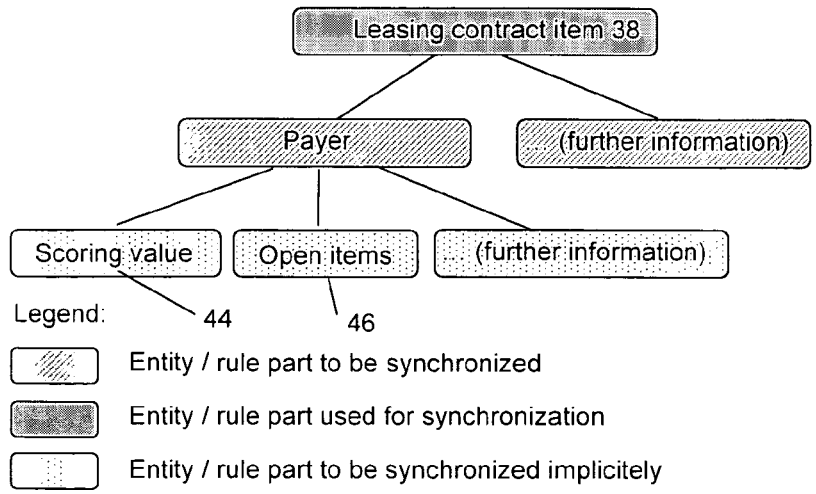

To ensure that only data of the same leasing contract item is used, the present system can synchronize on the leasing contract item entity 38, as shown in FIG. 3B. This might be particularly important to consider if, for example, there is other data used from the leasing contract item 38.

As shown in FIG. 3B, the lowest level entities (scoring value 44, open items 46, etc.) are marked differently, indicating the parent entity (in this case "Payer") will take care that the synchronization takes place for it's children. Accordingly, the leasing contract item 38 only has to care for its children. That is, these lower level entities are implicitly synchronized.

Another embodiment of the present disclosure, referred to as a change dependent mode, is arranged so that only changes of the rule relevant information are considered. This can be convenient and more efficient, since not every entity is always used to create rule instances. In the change dependent mode, only instances that contain at least one rule part that refers to data actually changed in combination with the current rule execution are used for rule processing.

Figure 4:
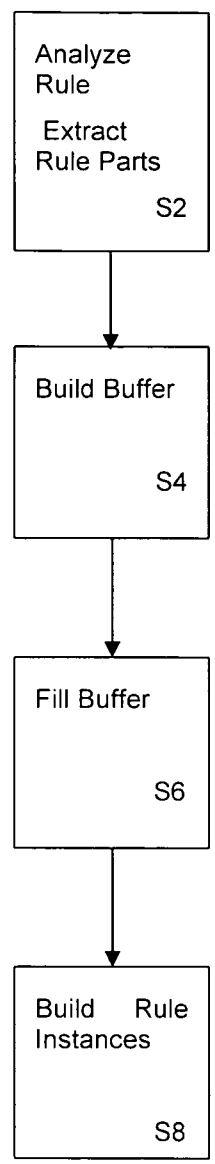
FIG. 4 shows a flow chart for describing a system and method used for implementing embodiments of the present disclosure.

The flow chart shown in FIG. 4 will be used to describe various embodiments of the present disclosure. Given a certain rule for execution along with information on the hierarchical business entity model, the method shown in FIG. 4 is performed. The rule is first parsed and analyzed so that all links to hierarchical business entities are extracted as rule parts (Step S2). Usually, modern rule engines are open to any kind of data, and the hierarchical business entity data will only be one of those possible inputs for the rule. For example, using SAP's BRF (SAP Business Rule Framework), the standard delivery includes rule parts such as formulas created with the SAP formula interpreter, case statements, etc. In addition, each part of a rule (referred to as an expression in BRF) can make use of other rule parts or expressions.

The system then builds a compressed hierarchical entity buffer over all the different parts of the rule (Step S4). Although each rule part (expression) might bring along it's own hierarchy, the hierarchy can be integrated for all the different rule parts. For example, if a rule part keeps the scoring value of the payer of a leasing contract, and another rule part keeps the open items list for the payer of a leasing contract, these two can be combined into one hierarchical buffer.

The compressed hierarchical entity buffer is then filled (Step S6). That is, after the setup, the buffer is filled from top to bottom so that results leaves that have parents can be tied back to exactly one result of the parent. There are two kinds of leaves. For example, there are leaves representing rule parts and there are leaves used only as intermediate or hierarchically higher result of other leaves that represent rule parts.

Figure 5B:
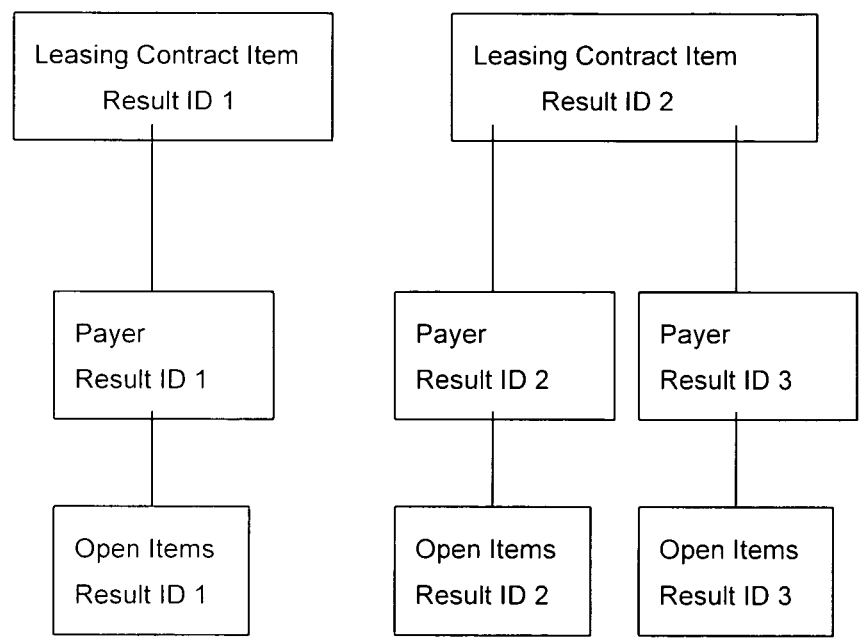

FIG. 5A is an example of a compressed hierarchical entity buffer. FIG. 5B is a hierarchical tree corresponding to the hierarchical entity buffer shown in FIG. 5A. In the example shown in FIG. 5A, the Leasing Item 51 and the Open Items 53 are used in a rule as indicated by the Xs in column 52. The Result ID (Column 55) indicates the instances of each entity. The Parent ID (Column 56) indicates the instance of the parent for each entity. For example, referring to FIGS. 5A, 5B, there are three instances of Payer (Result IDs 1-3). The parent of instance 1 of Payer (Result ID1) is Leasing Item instance 1 (Result ID 1). The parent of instances 2 and 3 of the Payer is instance 2 of the Leasing Item instance 2. The Payer information is not used in the rule, but as there is more than one payer, the Open Item leaves 53 refer back to the Payer leaf. For every result, a result ID is selected that is unique for the leaf. The result ID identifies the Real Result 59 for each instance of an entity.

Since the rule engine is generic, the system does not immediately know which type of data is being analyzed and what the structure of the data is. In order to provide a way for introspection into the data, the programmer of the rule part should indicate what data is delivered with the rule part. This metadata can be, for example, an entity key (GUID=global unique identifier), a logical data segment name, a logical data key name to find one among several entities in the segment, the field name, etc. The leaf can be transformed into the metadata described. It is then determined per result if the result data belongs to the changed data. If so, the "field match" (FIG. 5A, Column 60) flag is marked. The flag "field match" 60 is thus evaluated per result in the change dependent mode. That is, the application data that was changed in combination with the call of the business rule framework is available at the time where the results are calculated.

The system next builds the business rule instances via hierarchical oriented permutation (Step S8). Step S8 will now be described in more detail by reference to FIG. 6. A "step result" table is built that keeps track of the business rule instances and assigns results in the hierarchical buffer to those instances. For example, the step result table keeps entries and is structured to keep various data including Step ID (e.g., the rule instance number), the name of a rule part (e.g., leave ID) and a result ID of the rule part. According to an embodiment of the present disclosure, the step result table also keeps leaves that can be used to calculate rule parts, even if the leaves are not used directly in the rule. Accordingly, if more than one rule part belongs to a rule, each instance of the rule (represented by the step ID) leads to more than one entry in the step result table. The step result table is thus a kind of dynamic table that can dynamically take any additional rule part without having to define the superset of these rule parts statically in a data dictionary.

A rule part is first selected for processing (Step S60). A temporary step result table (TT) is then computed for the selected rule part (Step S62). The temporary step result table holds the result IDs of particular nodes in the hierarchy. For example, the temporary step result table holds the result IDs of the nodes of the rule part itself as well as all of the nodes that the rule part has in common with other business rule parts. The temporary step result table thus generally only keeps results relating to the rule part currently being processed. During processing, the TT table will be compared with a master step result table (MT). Initially, the MT table will be empty (Yes, Step S64). In this case, table TT will be used as the table MT (Step S84). The already processed rule part is then noted (Step S86) and the next rule part selected (Step S60). A TT table is then calculated for the newly selected rule part (Step S62). Table MT is now not empty (No, Step S64). Accordingly, the process continues to Step S66 where the lowest common leaf is determined (Step S66).

Figure 7B:
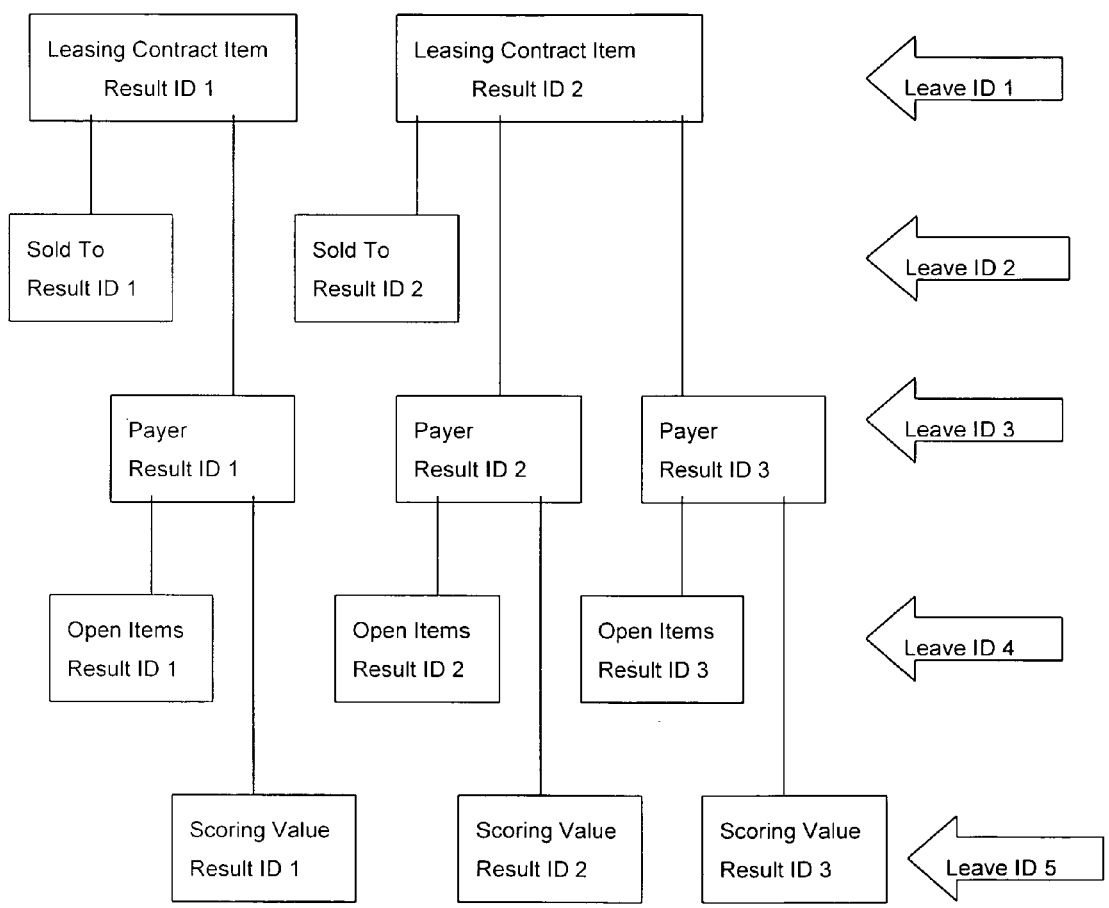

According to an embodiment of the present disclosure the system will determine the lowest common leaf in the hierarchy for each combination of business rule parts. An example of a table 80 used to determine the lowest common leaf for each combination of business rule parts for the hierarchical tree depicted in FIG. 7B and the corresponding hierarchical entity buffer in FIG. 7A is shown in FIG. 8. Table 80 lists the leaf IDs from the hierarchical entity buffer shown in FIG. 7A as columns and lines. Each of the values in table 80 indicates the lowest common leaf for that particular combination of business rule parts. For example, there is a value 3 in the table for the column "Open items (count) (leaf ID 4)" and the line "Scoring Value (leaf ID 5)". This indicates that both Open Items and Scoring Value depend on the Payer (Leaf ID 3), which is higher in the hierarchy. This is the lowest level common parent in the hierarchy for that combination of entities (see also FIG. 7B).

Next, the main step result table is looped to determine which leaves should be added to the main step result table. A comparing procedure starts in Step S68 where variables X and Y are set to one (1). Variable X represents a step number in table MT and variable Y represents a step number in table TT. The main step result table entries and the temporary step result table entries are thus compared instance by instance starting with Step S70. If the result ID of the lowest common leaf of the instance in the main step result table and the instance in the temporary step result table are different, no action needs to be taken (No, Step S72), since the entries belong to different parent nodes. The next pair of instances are then compared. That is, if not all steps in TT table have been considered (No, Step S76), Y is incremented (Step S78) and the next comparison is performed (Step S70). If the result ID of the lowest common leaf of the instance in the main step result table and the instance in the temporary step result table are the same (Yes, Step S72), a new instance is created and added to the main step result table (Step S74). It should be noted that, as described earlier above, the new instances created and added to the main step result table may or may not correspond to leaves actually used directly in the rule.

After all steps in table TT have been considered (Yes, Step S76), a determination is made whether all steps in table MT have been considered. If not (No, Step S80), X is incremented and Y is set to zero (Step S82) and the process repeats. After all steps in table MT have been considered (Yes, Step S80), the already processed rule part is noted (Step S86) and the entire process repeats.

Thus, according to an embodiment of the present disclosure, the system checks whether each leaf contained in the temporary step result table is also contained in the main step result table. If a leaf is not contained in the main step result table, the leaf is added to the main step result table.

In addition, according to an embodiment of the present disclosure, for each entry in the step table, the flag "field match" is marked if the relevant field behind the leaf has changed (e.g., when in the change dependent mode).

A field match algorithm for permutation can be performed. That is, in case the change dependant mode is turned on, every entry with the same rule instance (step ID) in the main step result table is evaluated. If there is no entry for the instance with the flag "field match" being marked, any entry with this instance (step ID) is deleted.

Figure 6:
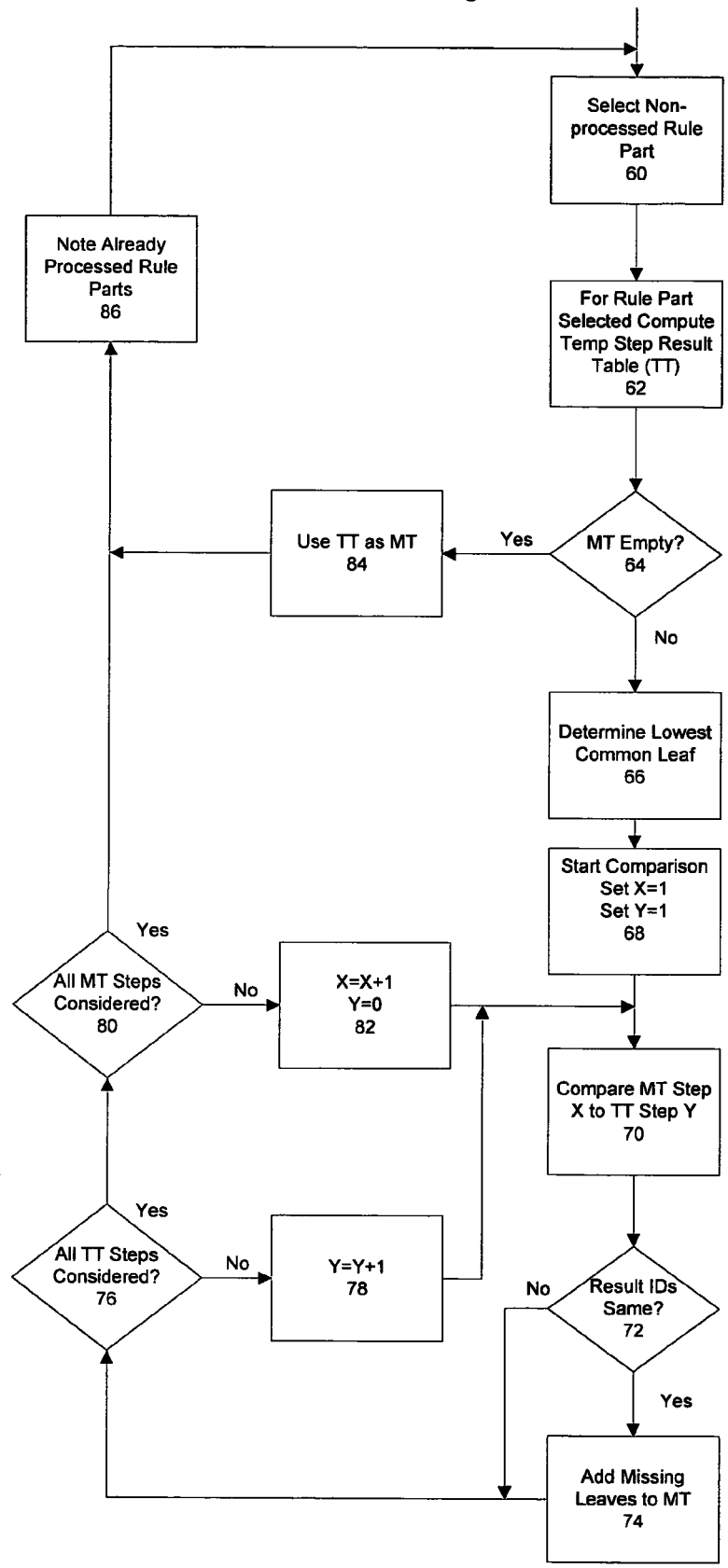
FIG. 6 shows a flow chart for describing a system and method used for implementing embodiments of the present disclosure.

The following is an example of the steps in FIG. 6 being performed using the hierarchical tree in FIG. 7B and the corresponding hierarchical entity buffer shown in FIG. 7A. It should be noted that the sequence that the rule parts are handled in does not affect the logic or outcome of the process shown in FIG. 6. In addition, it is noted that the temporary step result table will always have as many steps (instances) as the currently processed rule part has results. The hierarchical entity buffer in FIG. 7A includes a Leaf ID (Column 77) which identifies each entity. For example, Leaf ID 1 identifies the Leasing Contract Items, Leaf ID 2 identifies the Sold To entities, etc.

In this example, the Leasing Contract Items (Leaf ID1) are first considered (Step S60). The temporary step result table (TT) is first computed (Step S62) and is shown in FIG. 9A. As shown in FIGS. 7A, 7B, there are two instances of leaf ID 1 (Leasing Contract Item Result IDs 1, 2) In this case, since the master step result table (MT) is empty (Yes, Step S64), the TT is used as the MT (Step S84) (See also FIG. 9B). The already processed rule parts now include Leaf ID 1 (Step S86). Next, the Scoring Value (Leaf ID 5) is considered (Step S60). The Scoring Value (leaf ID 5) has the Leasing Contract Item (Leaf IDs 1) in common with the rule part "Sold To" (Leaf ID 2) and the Payer (Leaf ID 3) in common with "Open Items" (Leaf ID 4).

Next, the temporary step result table (TT) is computed (Step S62) and is shown in FIG. 10A. This is achieved by looking at each rule instance and determining the result ID of the rule part (e.g., Scoring Value) as well as the lowest common parent nodes this rule part has in common with other rule parts. This can be more readily seen by reference to FIG. 7B. In this case, the first instance (Step 1) consists of Leaf ID 1 (Result ID 1), Leaf ID 3 (Result ID 1) and Leaf ID 5 (Result ID 1). The second instance (Step 2) consists of Leaf ID1 (Result ID 2), Leaf ID 3 (Result ID 2) and Leaf ID 5 (Result ID 2). The third instance (Step 3) consists of Leaf ID 1 (Result ID 2), Leaf ID 3 (Result ID 3) and Leaf ID 5 (Result ID 3). At this point, there is a MT from the already processed rule part(s) (FIG. 9B) and a TT from the current rule part (FIG. 10A) with a new step that needs to be incorporated into the MT.

Next, the master table (MT) with the already processed rule parts is looped (except for the new rule parts that have just been added). For Leaf ID 1, the next step is to determine the lowest common leaf of the current rule part and the already processed rule parts (Step S66). In this case, the rule parts are represented by Leaf ID 5 (current rule part) and Leaf ID 1 (already processed rule part). They share the common Leaf ID 1, which is also the lowest level common parent (LLCP). The comparison procedure consisting of Steps S68-S82 is then performed. That is, the current and the temporary step tables are compared instance by instance to determine if the result ID of the lowest common leaf of the instance in the step table MT and the instance in the temporary step table TT are the same or different. If different, no action needs to be taken since the entries belong to different parent nodes and the next pair of instances can be compared.

However, in this case, the result ID of the lowest common leaf of the instance in the step table MT and the instance in the temporary step table TT are the same, as shown in FIG. 10B. It should be pointed out that in several instances in FIG. 10, only the portion of table MT currently being looped is shown (e.g., see FIG. 10B). Accordingly, a new instance (step) will be added to the step table MT. It is checked whether or not each leaf for that rule instance (step) contained in the temporary step table TT, is also contained in the step table MT. If not, the leaf is added to the step table MT. In this case, for Step 1 (rule instance 1), Leaf ID 3 (Result ID1) and Leaf ID 5 (Result ID 1) are added to table MT. The missing leaves are thus added to the MT as shown in FIG. 10C.

MT step 1 is then compared to TT step 2 (See FIG. 10D). Since the result IDs are not the same, nothing is added to table MT. The next comparison is then performed and MT step 1 is compared to TT step 3 (See FIG. 10E). Again, nothing is added to table MT since the leaves' result IDs are different. MT step 2 is then compared to TT step 1 (See FIG. 10F). The leaves' result IDs are different. Accordingly, nothing is added to table MT. Next, MT step 2 is compared to TT step 2 (See FIG. 10G). In this case, the leaves' result IDs are the same. Accordingly, the MT is updated by adding for step 2, Leaf ID 3 (Result ID 2) and Leaf ID 5 (Result ID 2). The resulting MT now looks as shown in FIG. 10H. MT step 2 is then compared to TT step 3. Again, the Result IDs are the same, as shown in FIG. 10I. Accordingly, the MT is again updated. The resulting MT looks as shown in FIG. 10J. Processing of rule parts leaf IDs 1 and 5 is now complete.

Figure 10M:
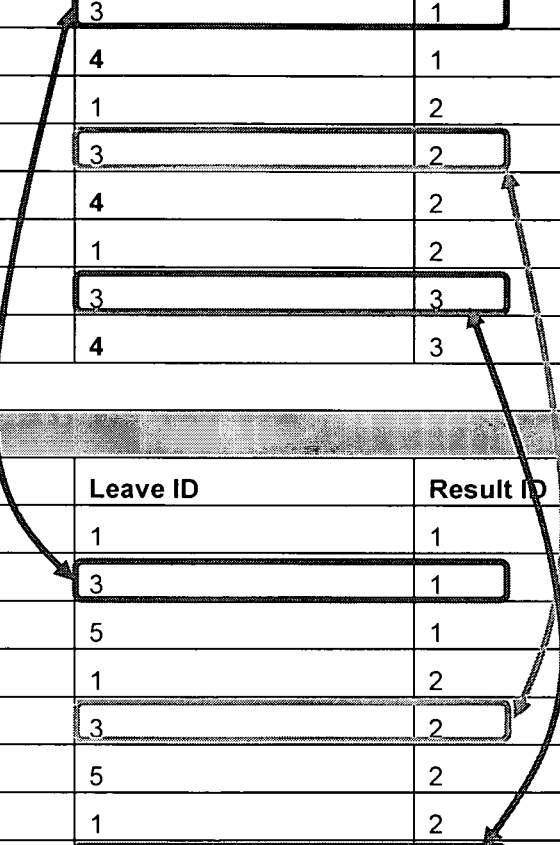

The Open Items (Leaf ID 4) is now considered and the process repeated. The TT for Leaf ID 4 is shown in FIG. 10K. The lowest common leaf of the current rule part and the already processed rule parts are now determined. As noted above, the rule parts with the Leaf IDs 1 and 5 have already been processed. The rule part currently being processed (Open Items) has the Leaf ID 4. The common leaves are circled as shown in the combination table in FIG. 10L. The leaf with ID 3 has the lowest level in the hierarchy. This is used as the lowest level common parent (LLCP). The steps are then the same as those described above. For brevity, only the matching cases of the new TT and the MT from the last step are shown in FIG. 10M. In all three instances, the result of Leaf ID 4 is missing in the table and is thus added to the MT. The resulting table MT is as shown in FIG. 10N.

The final leaf used in the rule is the Sold-To leaf (Leaf ID 2) which is now considered. The lowest level common parent that Leaf ID 2 has in common with all processed leaves is Leaf ID 1. Using the above process once again, the final result is a table MT that looks as shown in FIG. 10O.

Accordingly, the result is that the rule has three instances that need to be executed. With the help of the above step result table, the rule processor can now easily fetch the appropriate information from the result buffer to grab the current result per leaf and rule instance. That is, utilizing the above systems and methods, the rule framework can be made aware of the number of instances for the rule that was computed. For each instance number and rule part, the step table will keep the correct result ID. Using the result ID and rule part, the real result can be easily fetched and utilized by the rule engine.

The above example shows in general how the process works. It will be appreciated that the above is a relatively simple example used for ease of discussion. However, it should be noted that the present embodiments are particularly time saving and efficient with larger numbers of entities in the hierarchy where more complex step calculations would be performed.

The system can be implemented in digital electronic circuitry, or in computer hardware, firmware, software, or in combinations of them. The system can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the curriculum management system can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROMs (Compact Disc Read-only Memory) and DVD-ROMs (Digital Versatile Disc Read-only Memory). The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The system can be implemented in a computing system that includes a back-end component, e.g., as a data server, or that includes a middle-ware component, e.g., an application server, or that includes a front-end component, e.g., a client computer having a graphical interface or a Web browser through which a user can interact with an implementation of the invention, or any combination of such back-end, middleware, or front-end components. The components of the computing system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on respective computers and having a client-server relationship to each other.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. A method of processing instances of business rule for implementation by one or more data processors forming part of at least one computing system, the method comprising:
providing, by at least one data processor, a business rule;
parsing, by at least one data processor, the business rule to extract links to hierarchical business entities as rule parts;
creating, by at least one data processor, a hierarchical entity buffer indicating the entities used as the rule parts and identifying instances of each of the entities, instances of a parent, if any, for each of the entities, and real data corresponding to each of the identified instances of the entities;
creating, by at least one data processor, a step result table indicating instances of the business rule and information identifying the real data in the hierarchical entity buffer used by each of the instances of the business rule, the step result table being created by determining a lowest common leaf in the hierarchical entity buffer for each combination of rule parts;
creating, by at least one data processor, a temporary step table for a first rule part identifying the first rule part and all lowest common parent rule parts that the first rule part has in common with any other rule parts;
comparing, by at least one data processor, the step result table to the temporary step table instance by instance;
determining, by at least one data processor, for at least one new instance added to the step result table that a leaf in the temporary step table is not in the step result table; and
adding, by at least one data processor, the leaf to the step result table if a leaf in the temporary step table is not in the step result table.

2. The method of claim 1, wherein if a result ID indentifying the lowest common leaf of the instance in the step result table and a result ID identifying the instance in the temporary step table are different no further step is taken and wherein if the result ID identifying the lowest common leaf of the instance in the step result table and the result ID identifying the instance in the temporary step table are the same, a new instance is created, by at least one data processor, and added, by at least one data processor, to the step result table.

3. The method of claim 1, wherein the information identifying the real data comprises a result ID uniquely identifying the real data corresponding to each of the identified instances of the entities.

4. A non-transitory computer storage medium including computer executable for processing instances of business rules, comprising:
code for providing a business rule;
code for parsing the business rule to extract links to hierarchical business entities as rule parts;
code for creating a hierarchical entity buffer indicating:
the entities used as the rule parts in a first column,
instances of each of the entities in a second column,
instances of a parent, if any, for each of the entities in the second column in a third column, and
real data corresponding to each of the identified instances of the entities in a fourth column;
code for creating a step result table indicating instances of the business rule and information identifying the real data in the hierarchical entity buffer used by each of the instances of the business rule;
code for creating the step result table comprises code for determining a lowest common leaf in the hierarchical entity buffer for each combination of rule parts;
code for creating a temporary step table for a first rule part identifying the first rule part and all lowest common parent rule parts that the first rule part has in common with any other rule parts; and
code for comparing the step result table to the temporary step table instance by instance.

5. The computer storage medium of claim 4, wherein if a result ID indentifying the lowest common leaf of the instance in the step result table and a result ID identifying the instance in the temporary step table are different no further step is taken and wherein if the result ID identifying the lowest common leaf of the instance in the step result table and the result ID identifying the instance in the temporary step table are the same, a new instance is created and added to the step result table.

6. The computer storage medium of claim 5, further comprising, if the new instance is created and added to the step result table, determining whether each leaf in the temporary step table is also in the step result table.

7. The computer storage medium of claim 6, wherein if a leaf in the temporary step table is not in the step result table, adding the leaf to the step result table.

8. The computer storage medium of claim 4, wherein the information identifying the real data comprises a result ID uniquely identifying the real data corresponding to each of the identified instances of the entities.

9. A system comprising:
at least one data processor; and
memory storing instructions, which when executed by the at least one data processor, result in operations comprising:
providing a business rule;
parsing the business rule to extract links to hierarchical business entities as rule parts;
creating a hierarchical entity buffer indicating the entities used as the rule parts and identifying instances of each of the entities, instances of a parent, if any, for each of the entities, and real data corresponding to each of the identified instances of the entities;
creating a step result table indicating instances of the business rule and information identifying the real data in the hierarchical entity buffer used by each of the instances of the business rule, the step result table being created by determining a lowest common leaf in the hierarchical entity buffer for each combination of rule parts;
creating a temporary step table for a first rule part identifying the first rule part and all lowest common parent rule parts that the first rule part has in common with any other rule parts;
comparing the step result table to the temporary step table instance by instance;
determining for at least one new instance added to the step result table that a leaf in the temporary step table is not in the step result table; and
adding the leaf to the step result table if a leaf in the temporary step table is not in the step result table.

10. The system of claim 9, wherein if a result ID indentifying the lowest common leaf of the instance in the step result table and a result ID identifying the instance in the temporary step table are different no further step is taken and wherein if the result ID identifying the lowest common leaf of the instance in the step result table and the result ID identifying the instance in the temporary step table are the same, a new instance is created, by at least one data processor, and added, by at least one data processor, to the step result table.

11. The system of claim 10, wherein the operations further comprise, if the new instance is created and added to the step result table, determining whether each leaf in the temporary step table is also in the step result table.

12. The system of claim 10, wherein the information identifying the real data comprises a result ID uniquely identifying the real data corresponding to each of the identified instances of the entities.

* * * * *